(12) United States Patent
Gernon

(10) Patent No.: US 7,553,882 B2
(45) Date of Patent: Jun. 30, 2009

(54) COMPOSITIONS PROVIDING PHYSICAL BIOCIDE SYNERGIST ACTIVITY IN PAINTS, COATINGS, SEALANTS AND ADHESIVES DURING STORAGE

(75) Inventor: Michael D. Gernon, Phoenixville, PA (US)

(73) Assignee: Taminco, Gent (BE)

( * ) Notice: Subject to any disclaimer, the term of this patent is extended or adjusted under 35 U.S.C. 154(b) by 563 days.

(21) Appl. No.: 11/200,224

(22) Filed: Aug. 9, 2005

(65) Prior Publication Data

US 2005/0288388 A1 Dec. 29, 2005

Related U.S. Application Data

(63) Continuation of application No. 10/420,448, filed on Apr. 22, 2003, now abandoned.

(60) Provisional application No. 60/378,830, filed on May 8, 2002.

(51) Int. Cl.
C09D 5/16 (2006.01)
C08K 5/05 (2006.01)
C09K 15/20 (2006.01)

(52) U.S. Cl. .................. 523/122; 106/18.32; 106/15.05; 252/401; 252/182.29; 252/182.23; 252/182.13

(58) Field of Classification Search ............ 252/182.29; 106/18.32; 523/122
See application file for complete search history.

(56) References Cited

U.S. PATENT DOCUMENTS

| | | | |
|---|---|---|---|
| 4,134,971 A | 1/1979 | Inoue et al. | |
| 4,165,318 A * | 8/1979 | Greenfield et al. | 548/213 |
| RE31,936 E * | 7/1985 | Sperry et al. | 524/522 |
| 4,664,708 A | 5/1987 | Allen | |
| 4,925,582 A | 5/1990 | Bennett | |
| 5,132,046 A | 7/1992 | Edebo et al. | |
| 5,183,842 A * | 2/1993 | O'Neil et al. | 524/288 |
| 5,444,093 A | 8/1995 | Goettsche et al. | |
| 6,428,613 B1 * | 8/2002 | Matsunaga et al. | 106/31.58 |
| 2003/0209165 A1 * | 11/2003 | Gernon | 106/15.05 |
| 2004/0035803 A1 | 2/2004 | Cronan et al. | |
| 2005/0272842 A1 * | 12/2005 | Alford et al. | 524/186 |
| 2005/0288388 A1 * | 12/2005 | Gernon | 523/122 |
| 2006/0106129 A1 * | 5/2006 | Gernon et al. | 523/122 |

FOREIGN PATENT DOCUMENTS

| | | |
|---|---|---|
| GB | 1 386 516 | 3/1975 |
| JP | 8 193 015 | 7/1996 |
| JP | 08193015 | 7/1996 |
| WO | 02/23990 A1 | 3/2002 |

OTHER PUBLICATIONS

Golec, et al., "Oil/WaterPpartition for Some Hydroxyalkylamines and Antimicrobial Efficacy in Metal Working Coolants" Tribology International, Dec. 1989, 22(6), pp. 375-382.
Aumann, et al., "Boost Your Resistance—Metal Working Fluid Life Can Depend on Alkanolamine Choices", Lubes'N'Greases, Jun. 2000, 6(6), pp. 22-26.
Sandin, et al., "Control of Microbial Growth in Water-Based Metal-Working Fluids", International Biodeterioration, 1991, 27, pp. 61-74.
Bennet, E., "Corrosion Inhibitors as Preservatives for Metalworking Fluids-Ethanolamines", Lubrication Engineering, Mar. 1979, 33(3), pp. 137-144.
Sandin, et al., "Slective Toxicity of Alkanolamines", Antimicrobial Agents and Chemotherpy, Mar. 1990, pp. 491-493.
Sandin, M., et al., "The Role of Alkyl Chain Length On the Antibacterial Activity of Alkyl Ethanolamines", Biomedical Letters, The Faulty Press, Cambtidge, GB, vol. 41, No. 185, 1992, pp. 85-92.
Golec, et al., "Oil/Water Partition for Some Hydroxyalkylamines and Antimicrobial Efficacy in Metalworking Coolants" Tribology International—Dec. 1989, 22(6) pp. 375-382.
Aumann, et al. "Boost Your Resistance—Metal Working Fluid Life Can Depend On Alkonolamine Choices" Lubes'N'Greases—Jun. 2000 6(6) pp. 22-26.
Sandin, et al. "Control of Microbial Growth in Water-Based Metal-Working Fluids" International Biodeterioration—1991, 27 pp. 61-74.
Sandin, et al. "Selective Toxicity of Alkanolamines" Antimicrobial Agents and Chemotherapy—Mar. 1990 pp. 491-493.
Bennett, E. "Corrosion Inhibitors as Preservatives for Metalworking Fluids—Ethanolamines" Lubrication Engineering—Mar. 1979, 35(3) pp. 137-144.
Sandin, M., et al. "The Role of Alkyl Chain Length On The Antibacterial Activity of Alkyl Ethanolamines" Biomedical Letters, The Faculty Press, Cambridge, GB, vol. 41, No. 185, 1992, pp. 85-92.

* cited by examiner

*Primary Examiner*—Joseph D Anthony
(74) *Attorney, Agent, or Firm*—Sughrue Mion, PLLC

(57) ABSTRACT

This invention relates to the use of an N-alkylethanolamine or N,N-dialkylethanolamine wherein each N-alkyl group is independently a $C_3$ through $C_{12}$ straight chain or branched alkyl group, the substituted ethanolamine is used in combination with a biocide for the anaerobic shelf stabilization of a latex paint, uncured coating, uncured sealant, uncured adhesive or related product.

8 Claims, No Drawings

COMPOSITIONS PROVIDING PHYSICAL BIOCIDE SYNERGIST ACTIVITY IN PAINTS, COATINGS, SEALANTS AND ADHESIVES DURING STORAGE

REFERENCE TO RELATED APPLICATION

This application is a continuation of U.S. application Ser. No. 10/420,448 filed Apr. 22, 2003 now abandoned which claims the benefit of U.S. Provisional Application Ser. No. 60/378,830, filed May 8, 2002.

BACKGROUND OF THE INVENTION

1. Field of the Invention

This invention relates to compositions having physical biocide synergist activity and additionally to the use of these compositions for increasing the shelf life of stored formulated products.

2. Description of the Prior Art

Paints, coatings, sealants, adhesives and related products are typically produced as uncured and/or fluid mixtures which are sealed and stored for a period of time prior to use. The storage period can be as long as several years.

During storage, microbial contaminants that were introduced during the production of the product can proliferate. Such microbial proliferation can result in a number of undesirable consequences. The microbes can discolor the product, produce stringy filamentous growths, produce foul odors, selectively consume components of the formulation and generally degrade the product to a point where it is no longer acceptable to the customer.

In order to prevent such microbial proliferation during product storage, many formulators add "in-can" biocides to paints, coatings, sealants, adhesives and related products prior to final packaging for shelf storage. The use of such biocides controls the problems associated with microbial proliferation during storage, but these biocides introduce problems of their own. Biocides tend to be toxic, and government regulatory agencies are pressuring formulators to use less and less biocide in their products. The need to formulate bio-resistant products with less biocide has driven paint, coating, sealant and adhesive manufacturers to seek novel strategies for microbial control.

The use of various compounds as biocides and biocide synergists in open circulating metalworking systems is known.

Golec et al. (Tribology International, December 1989, 22(6), 375-382) have described the antimicrobial efficacy of alkanolamines in open circulating metalworking coolants.

Aumann et al. (Lubes'N'Greases, June 2000, 6(6), 22-26) have described the efficacy of AMP (2-amino-2-methyl-1-propanol), MEA (monoethanolamine), TEA (triethanolamine) and DGA (diglycolamine) as antimicrobial synergists in open circulating metalworking coolants.

Sandin et al. (International Biodeterioration, 1991, 27, 61-74) describe the use of diethanolamine, butylethanolamine and dimethylaminomethylpropanol as antimicrobial agents with an emphasis on controlling fungus in open circulating metalworking fluids.

Edebo et al. (U.S. Pat. No. 5,132,046) describe the of long chain alkylaminoethanols as antimicrobial agents in open circulating metalworking fluids.

Sandin et al. (Antimicrobial Agents And Chemotherapy, March 1990, 491-493 describe the use of diethanolamine, dimethylaminomethylpropanol and butylaminoethanol as antimicrobial agents for control of *Pseudomonas pseudocaligenes* with an emphasis on metalworking fluid applications.

E. O. Bennett (Lubrication Engineering, March 1979, 35(3), 137-144) describes the effect of numerous alkylalkanolamines on the bio-resistance of open circulating metalworking fluids.

E. O. Bennett (U.S. Pat. No. 4,925,582) claims the use of N-hexylethanolamine and N-amylethanolamine as biocide synergists in open circulating metalworking fluids.

Additionally, a number of references have described the utility of alkanolamines and quaternary ammonium compounds derived from them as antimicrobial agents for use in cleaning solutions.

Inoue et al. (U.S. Pat. No. 4,134,971 & family) claim $RNHCH_2CH_2OH$, where R is a C10 to C20 straight chain alkyl, combined with metal chelating agents (e.g., sodium EDTA) as biocides for use in non-medical applications.

Shimotomai et al. (JP 08193015) claim the use a number of alkanolamine type compounds in combination with BIT (benzoisothiazoline-3-one) as enhanced biocides in open systems.

Lichtenberg et al. (WO 2002023990A1) describe the use of a limited set of alkanolamine synergists in combination with certain types of quaternary ammonium biocides. The quaternary ammonium biocides discussed by Lichtenberg are not used for "in-can" preservation of paints, coatings, sealants and adhesives.

All of the known work published to date is focused on the use of alkylalkanolamine (AAA) synergists in open circulating systems throughout the usable life of the system. The present invention differs in that it describes the use of physical biocide synergists in formulated products during their storage in sealed containers, and this invention is intended to be effective only for the period of storage.

SUMMARY OF THE INVENTION

This invention can be described as the use of certain N-alkylalkanolamines and/or N,N-dialkylalkanolamines as biocide synergists for stabilization of stored paints, uncured coatings, uncured sealants, uncured adhesives and related products under mostly anaerobic conditions.

The useful biocide synergists can be represented by the formulas:

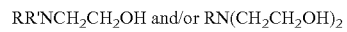

RR'NCH$_2$CH$_2$OH and/or RN(CH$_2$CH$_2$OH)$_2$ wherein R is a straight chain or branched alkyl group with 3 to 12 carbon atoms; and R' is hydrogen or a straight chain or branched alkyl group with 3 to 12 carbon atoms, wherein the alkyl group is the same or different from that of R.

DETAILED DESCRIPTION OF THE INVENTION

This invention provides a novel means of using biocides more effectively. By combining typical biocides with the alkanolamines described herein, one can obtain much better microbial control per unit of biocide than is obtainable without the alkanolamine.

Compounds that can enhance the effectiveness of biocides are generally known as synergists. The synergist alkanolamines described in this invention have the added advantage that they are intended for use in formulations that typically already employ added amines. Thus, the amine synergists can serve as pH adjustors, resin-solubilizing agents, corrosion inhibitors etc. while also enhancing biocide activity through physical synergist mechanisms. By substituting all or a portion of the amine content which is already contained in a paint, coating, sealant or adhesive formulation with one of the synergist alkanolamines described herein, one obtains a product with the same overall amine level and reduced levels of biocide.

The synergist alkanolamines can be represented by the formulas:

RR'NCH$_2$CH$_2$OH and/or RN(CH$_2$CH$_2$OH)$_2$ wherein R is a straight chain or branched alkyl group with 3 to 12 carbon atoms; and R' is hydrogen or a straight chain or branched alkyl group with 3 to 12 carbon atoms, wherein the alkyl group is the same or different from that of R. Preferred are alkanalamines such as butylaminoethanol (BAE), isopropylaminoethanol (IPAE) and amylaminoethanol (AAE).

A heteroatom substitution in the alkyl chain is not necessary, but such substitution should not preclude a compound from being covered by this disclosure.

The disclosed alkanolamines are effective with a number of different biocides as is typical of physical biocide synergists. The alkanolamines are added to the uncured product as part of the formulation, and oftentimes these synergist amines can serve additional purposes for which amines are typically used. Such typical purposes include pH adjustment, resin solubilization, corrosion inhibition and metal ion complexation.

The amines should be used at levels between 200 ppm and 15,000 ppm with 1,000 ppm to 10,000 ppm being preferred, and 1,500 ppm to 8,500 ppm being most preferred. Below about 200 ppm, the amines tend to lose effectiveness. Above 15,000 ppm, the addition of further amine does little to improve the physical biocide synergy.

The biocide may be any compound effective in stabilizing shelf stored paints, coatings, sealants and adhesives. Typical biocides include isothiazolinones, benzoisothiazolinones, formaldehyde, triazines, gluteraldehyde, bronopol and phenolics. Preferably the biocide is something other than a quaternary ammonium biocide.

The amine is added to the formulation along with the other components and the biocide prior to sealing for shelf storage. The synergist alkanolamines should be used at a level between 200 ppm and 1,500 ppm in the shelf stored formulation with a preferred range of 1,000 ppm to 10,000 ppm. The synergist alkanolamine may be volatile (e.g., N-isopropyle-thanolamine) so that it will evaporate from the product after the package is opened, or the synergist alkanolamine may be non-volatile (e.g., didodecylaminoethanol) so that it will remain in the product after the package is opened. If the synergist alkanolamine and biocide remain in the product after the package is opened, then the benefit of enhanced biocide activity may continue in the cured material (e.g., in the cured paint film).

For latex paints based on resins comprising copolymers of acrylate esters, vinyl acetate and/or styrene, a particularly preferred embodiment involves addition of between two pounds and ten pounds of butylaminoethanol (BAE) per 100 gallons of finished latex paint.

The following examples are illustrative of the invention but are not intended to be exhaustive or to limit the invention to the precise form disclosed. Many other variations and modifications are possible in light of the specifications and examples.

EXAMPLE 1

Demonstrate the Effectiveness of Certain Alkylalkanolamines as Physical Biocide Synergists A 384 well microtiter plate set up for measuring optical density at 660 nm was employed. Each well was filled with 25 microliters of alkylalkanolamine (AAA) solution buffered with Tris to pH=7.5, 25 microliters of nutrient/innoculum solution at pH=7.5 (nutrient=TSB) and 25 microliters of biocide solution adjusted to pH=7.5 for a total volume of 75 microliters. In any given experiment, both the structure and concentration of the AAA were varied along with the concentration of the biocide. The temperature was maintained at 25° C. throughout the experiment. Optical density measurements were made at 15 min intervals. We established that the microbial concentration was linearly related to optical absorbance in all cases, and optical density (OD) values were used as a direct measurement of microbial density. Based on OD measurements, the maximum rate of microbial growth and the 18 hour and 48 hour end point microbial densities could be calculated.

Below is a Table showing the end point concentration (based on optical density) at 18 hours for *Pseudomonas aeruginosa* (ATCC 10145) after treatment with various levels of Troysan 785 (78.5% aqueous solution of hexahydro-1,3, 5-tris-2-hydroxyethyl-s-triazine as supplied by Troy Chemicals of Florham Park, N.J.) in the presence of different alkanolamines. The following acronyms have been used; AMP=2-amino-2-methyl-1-propanol, BAE=N-butylaminoethanol, DBAE=N,N-dibutylaminoethanol, OAE=N-octylaminoethanol.

| | Troysan Concentration | | | | |
|---|---|---|---|---|---|
| [AAA] | 500 ppm | 300 ppm | 200 ppm | 100 ppm | 50 ppm |
| AMP (1000 ppm) | 0.33 | 0.36 | 0.38 | 0.4 | 0.4 |
| DBAE (1000 ppm) | 0.19 | 0.23 | 0.24 | 0.24 | 0.24 |
| AMP (2000 ppm) | 0.15 | 0.21 | 0.23 | 0.23 | 0.23 |
| BAE (1000 ppm) | 0.12 | 0.18 | 0.22 | 0.23 | 0.23 |
| DBAE (2000 ppm) | 0.12 | 0.14 | 0.15 | 0.15 | 0.15 |
| BAE (2000 ppm) | 0.06 | 0.08 | 0.08 | 0.09 | 0.09 |
| OAE (1000 ppm) | 0.05 | 0.04 | 0.04 | 0.03 | 0.03 |
| OAE (2000 ppm) | 0.05 | 0.04 | 0.03 | 0.03 | 0.03 |

One can see from the data that the amines described herein (BAE, DBAE and OAE) are more effective than an arbitrary AAA (e.g., AMP) in controlling microbial growth.

A plot of the maximum growth slope (values given in milli-OD units per second) for this system is presented below (5 point best fit of the linear portion of the growth curve):

| | Troysan Concentration | | | | |
|---|---|---|---|---|---|
| [AAA] | 500 ppm | 300 ppm | 200 ppm | 100 ppm | 50 ppm |
| AMP (1000 ppm) | 0.414 | 0.443 | 0.415 | 0.328 | 0.309 |
| DBAE (1000 ppm) | 0.168 | 0.206 | 0.214 | 0.268 | 0.246 |
| AMP (2000 ppm) | 0.131 | 0.343 | 0.368 | 0.318 | 0.251 |

-continued

| [AAA] | Troysan Concentration | | | | |
|---|---|---|---|---|---|
| | 500 ppm | 300 ppm | 200 ppm | 100 ppm | 50 ppm |
| BAE (1000 ppm) | 0 | 0.039 | 0.06 | 0.126 | 0.108 |
| DBAE (2000 ppm) | 0.198 | 0.194 | 0.199 | 0.205 | 0.177 |
| BAE (2000 ppm) | 0.093 | 0.113 | 0.105 | 0.098 | 0.115 |
| OAE (1000 ppm) | 0 | 0 | 0 | 0 | 0 |
| OAE (2000 ppm) | 0 | 0 | 0 | 0 | 0 |

Again, the utility of the amines described herein is seen.

EXAMPLE 2

Demonstrate that BAE can be Used as a Neutralizing Amine in Latex Paint

FORMULATIONS: Two amines (BAE and AMP) were incorporated separately into two architectural interior latex coatings (a flat and a semi-gloss coating).

The paint formulations were:

| % NVM | AMP-95 | BAE |
|---|---|---|
| HIGH QUALITY FLAT INTERIOR PAINT | | |
| DI Water | 150.0 | 150.0 |
| Propylene Glycol | 25.9 | 25.9 |
| Proxel GXL | 0.5 | 0.5 |
| Colloid 226/35 | 8.0 | 8.0 |
| Tergitol NP-9 | 2.2 | 2.2 |
| Colloid 640 | 3.5 | 3.5 |
| Polyphobe 102 | 15.0 | 15.0 |
| AMP-95 | 5.0 | — |
| BAE | — | 5.0 |
| Ti-Pure R-902 | 250.0 | 250.0 |
| Snowflake PE | 125.0 | 125.0 |
| Minex 4 | 125.0 | 125.0 |
| Disperse at high speed then letdown with: | | |
| UCAR Latex 379G    (55) | 419.8 | 419.8 |
| UCAR Filmer IBT | 16.8 | 16.8 |
| Colloid 640 | 3.5 | 3.5 |
| Adjust pH to 9.0 ± 0.2 viscocity to 90 ± 2 KU with: | | |
| Polyphobe 102 | 14.5 | 14.5 |
| AMP-95 | 2.0 | — |
| BAE | — | 2.0 |
| DI Water | 51.3 | 51.3 |
| Total Weight    Pounds | 1218.0 | 1218.0 |
| Total Yield    Gallons | 101.0 | 101.0 |

| % NVM | AMP-95 | BAE |
|---|---|---|
| SEMIGLOSS INTERIOR ENAMEL | | |
| DI Water | 100.0 | 100.0 |
| Cellosize ER-15000 | 2.0 | 2.0 |
| Nuosept 145 | 2.4 | 2.4 |
| Tamol 731 | 9.2 | 9.2 |
| Triton N-57 | 2.1 | 2.1 |
| AMP-95 | 1.0 | — |
| BAE | — | 1.0 |
| Propylene Glycol | 43.2 | 43.2 |
| Byk 035 | 1.0 | 1.0 |
| Tronox CR-800 | 250.0 | 250.0 |

| % NVM | AMP-95 | BAE |
|---|---|---|
| Disperse at high speed then letdown with: | | |
| UCAR Latex 379G    (55) | 428.4 | 428.4 |
| UCAR Filmer IBT | 20.0 | 20.0 |
| Byk 035 | 1.9 | 1.9 |
| Triton GR-7M | 0.5 | 0.5 |
| Adjust pH to 8.5 ± 0.2 viscocity to 88 ± 2 KU with: | | |
| AMP-95 | 0.5 | — |
| BAE | — | 0.5 |
| DI Water | 168.2 | 168.2 |
| Acrysol SCT-275 | 10.0 | 10.0 |
| DI Water | 10.0 | 10.0 |
| Propylene Glycol | 10.0 | 10.0 |
| Total Weight    Pounds | 1060.4 | 1060.4 |
| Total Yield    Gallons | 100.1 | 100.1 |

PROCEDURES: The coatings were evaluated using the following procedures.

| Procedure | ASTM Test Method |
|---|---|
| Fineness of Dispersion | D 1210 |
| Viscosity - Stormer viscometer | D 562 |
| pH | E 70 |
| Dry Time | D 1640 |
| Odor | D 1296 |
| Gloss/Sheen | D 523 |
| Opacity, 3-mil drawdown | D 2805 |
| Package Stability - 2 wks at 125° F. | D 1849 |
| Syneresis | |
| Settling | |
| Ease of redispersion | |
| Viscosity | |
| Scrubbability | D 2486 |
| Film Porosity | D 3258 |
| Color acceptance | (a) |
| Color development | (b) |
| Application properties | (c) |

Color Acceptance—The test paint was tinted with each tinting colorant at 1% by weight of paint and applied to a sealed chart using a 3-mil Bird applicator. After drying, the relative depth of color was rated in accordance with the ASTM Standardized Scoring Scheme below. The colorants used are Colortrend Universal Colorants, Series 888-1045F Red Iron Oxide, 7214E Thalo Blue, and 2009L Raw Umber.

Color Development—Using the same drawdown application as above, as the paint begins to dry; a 1-inch area was gently rubbed to redisperse any flocculated colorant. The change in color of the rubbed area verses the unrubbed area was rated in accordance with the ASTM Standardized Scoring Scheme below.

Application Properties—Two-thirds of a 24×32-Inch Upson Board was primed with one coat of a latex primer and allowed to dry 24 hours. A portion of the primer was tinted a gray color (nominal reflectance of 25) and applied as a 3-inch stripe horizontally across the center of the primed area. After 48 hours drying the test panel was ready for the application of the test paint.

The test paints were applied freely over the entire panel using a 3-inch roller (EZ Painter No. 3 FPS) until the gray stripe was obliterated (wet). The spreading rate was calculated from the amount of paint used and the weight per gallon of the paint. After drying overnight, a second coat was applied to one-third of the panel. After fifteen minutes, a 6-inch lap coat was applied covering 3-inches each of the first coat and second coat areas. The painted panel was allowed to dry overnight before applying a 4×4-inch touch-up on the two-coat area.

The paints were also evaluated for the following properties:

Ease of Application
Spreading Rate
Practical Opacity
Foaming
Spatter
Leveling
Cratering
Sheen Uniformity
    One coat versus two coat area
    Primed versus unprimed areas
    Lap area
    Touch-up area Some observations were subjective and have been rated using the following ASTM Standardized Scoring System in order to avoid lengthy descriptions:

| Score | Performance or | Effect |
|---|---|---|
| 10 | Perfect | None |
| 9 | Excellent | Trace |
| 8 | Very good | Very slight |
| 6 | Good | Slight |
| 4 | Fair | Moderate |
| 2 | Poor | Considerable |
| 1 | Very poor | Severe |
| 0 | No value | Complete failure |

TEST RESULTS

| HIGH QUALITY FLAT INTERIOR PAINT | | | |
|---|---|---|---|
| | | AMP-95 | BAE |
| Fineness of Dispersion | | | |
| Mill base | Hegman | 4 | 4 |
| Grinding time | Minutes | 15 | 15 |
| Final | Hegman | 4 | 4 |
| Viscosity | KU | | |
| Initial | | 93 | 89 |
| After 2 weeks at 125° F. | | 87 | 83 |
| Difference | | −6 | −6 |
| pH | | | |
| Initial | | 9.2 | 9.1 |
| After 2 weeks at 125° F. | | 8.5 | 8.1 |
| Difference | | −0.7 | −1.0 |
| Package Stability | Score | | |
| Syneresis | | 9 | 8 |
| Settling | | 10 | 10 |
| Ease of redispersion | | 10 | 10 |
| Seeding | | 10 | 10 |
| Dry Time | Minutes | | |
| Set to touch | | 10 | 10 |
| Tack free | | 15 | 17 |
| Dry hard | | 25 | 40 |
| Dry through | | 30 | 45 |
| Gloss - 60° | Units | 8 | 8 |
| Sheen - 85° | Units | 9 | 9 |
| Opacity - 3 mil drawdown | | | |
| Contrast ratio | | 0.967 | 0.964 |
| Odor | | Not obnoxious | Not obnoxious |
| Scrubbability | Cycles | 4100 | 4100 |

| HIGH QUALITY FLAT INTERIOR PAINT -continued | | | |
|---|---|---|---|
| | | AMP-95 | BAE |
| Film Porosity | | | |
| Reflectance | Percent | | |
| Before staining | | 91.4 | 94.0 |
| After staining | | 89.9 | 92.5 |
| Difference | | 1.5 | 1.5 |
| Color Acceptance | Score | | |
| Red Iron Oxide | | 10 | 10 |
| Thalo Blue | | 10 | 10 |
| Raw Umber | | 10 | 10 |
| Color Acceptance | Score | | |
| Red Iron Oxide | | 8 | 8 |
| Thalo Blue | | 8 | 8 |
| Raw Umber | | 10 | 10 |
| Application Properties | | | |
| Ease of application | Score | 9 | 9 |
| Spreading rate | Ft$^2$/gal | 415 | 400 |
| Practical opacity | Score | 8 | 6 |
| Foaming | " | 10 | 10 |
| Spattering | " | 8 | 8 |
| Leveling | " | 8 | 8 |
| Cratering | " | 10 | 10 |
| Sheen Uniformity | | | |
| One coat versus two coat area | Score | 9 | 9 |
| Primed versus unprimed area | " | 10 | 10 |
| Lap area | " | 8 | 8 |
| Touch-up area | " | 8 | 8 |

| SEMIGLOSS INTERIOR ENAMEL | | | |
|---|---|---|---|
| | | AMP-95 | BAE |
| Fineness of Dispersion | | | |
| Mill base | Hegman | 7 | 7 |
| Grinding time | Minutes | 15 | 15 |
| Final | Hegman | 7 | 7 |
| Viscosity | KU | | |
| Initial | | 86 | 89 |
| After 2 weeks at 125° F. | | 90 | 92 |
| Difference | | 4 | 3 |
| pH | | | |
| Initial | | 8.4 | 8.3 |
| After 2 weeks at 125° F. | | 7.6 | 7.4 |
| Difference | | −0.8 | −0.9 |
| Package Stability | Score | | |
| Syneresis | | 6 | 6 |
| Settling | | 10 | 10 |
| Ease of redispersion | | 8 | 8 |
| Seeding | | 10 | 10 |
| Dry Time | Minutes | | |
| Set to touch | | 15 | 20 |
| Tack free | | 115 | 115 |
| Dry hard | | 135 | 150 |
| Dry through | | 150 | 165 |
| Gloss - 60° | Units | 70 | 70 |
| Sheen - 85° | Units | 91 | 91 |
| Opacity - 3 mil drawdown | | | |
| Contrast ratio | | 0.966 | 0.968 |
| Odor | Score | Not obnoxious | Not obnoxious |
| Scrubbability | Cycles | >2500 | >2500 |
| Film Porosity Reflectance | Percent | | |
| Before staining | | 94.8 | 94.7 |
| After staining | | 93.7 | 93.6 |
| Difference | | 1.1 | 1.1 |
| Color Acceptance | Score | | |
| Red Iron Oxide | | 10 | 10 |

-continued

SEMIGLOSS INTERIOR ENAMEL

| | | AMP-95 | BAE |
|---|---|---|---|
| Thalo Blue | | 10 | 10 |
| Raw Umber | | 10 | 10 |
| Color Acceptance | Score | | |
| Red Iron Oxide | | 10 | 10 |
| Thalo Blue | | 10 | 10 |
| Raw Umber | | 10 | 10 |
| Application Properties | | | |
| Ease of application | Score | 9 | 9 |
| Spreading rate | Ft²/gal | 340 | 320 |
| Practical opacity | Score | 8 | 6 |
| Foaming | " | 4 | 4 |
| Spattering | " | 2 | 2 |
| Leveling | " | 8 | 8 |
| Cratering | " | 10 | 10 |
| Sheen Uniformity | | | |
| One coat versus two coat area | Score | 6 | 6 |
| Primed versus unprimed area | " | 10 | 10 |
| Lap area | " | 6 | 6 |
| Touch-up area | " | 4 | 4 |

The use of BAE as a replacement for AMP in either the flat or semi-gloss paints evaluated in this study provided for comparable results both when incorporated into the mill base and/or into the letdown phase of the paint manufacturing. The BAE material exhibited equal effectiveness with regard to pigment dispersion and pH adjustment. Some additional observations based on the data collected are:

High Quality Flat Interior Paint
1. The BAE flat coating was comparable to AMP-95 coating for Fineness of Dispersion, Viscosity, pH, Package Stability, Gloss, Sheen, Opacity, Odor, Scrubbability, Film Porosity, Color Acceptance, and Color Development.
2. The BAE coating exhibited a noticeable increase in the Tack Free, Dry Hard and Dry Through Dry Time properties.

Semi-Gloss Interior Enamel
1. The BAE semi-gloss coating was comparable to AMP-95 coating for Fineness of Dispersion, Viscosity, pH, Package Stability, Gloss, Sheen, Opacity, Odor, Scrubbability, Film Porosity, Color Acceptance, and Color Development.
2. The BAE coating exhibited a very slight increase in the Tack Free, Dry Hard and Dry Through Dry Time properties.

The invention claimed is:

1. A method of stabilizing a stored latex paint, uncured coating, uncured sealant, or uncured adhesive formulation, comprising adding thereto a compound having the formula:

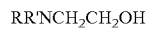

RR'NCH₂CH₂OH wherein R is a straight chain or branched butyl group and R' is hydrogen or a straight chain or branched butyl group, in combination with a biocide, in an amount of two to ten pounds of said compound per 100 gallons of finished formulation, and storing said latex paint, uncured coating, uncured sealant, or uncured adhesive formulation under anaerobic conditions.

2. Method according to claim 1 in which the stored latex paint, uncured coating, uncured sealant, or uncured adhesive formulation is based on resins comprising copolymers of acrylate esters, vinyl acetate and/or stryene.

3. A method of stabilizing a stored latex paint, uncured coating, uncured sealant, or uncured adhesive formulation, comprising adding thereto an N-alkylethanolamine wherein the N-alkyl group is a straight chain or branched butyl group, in combination with a biocide, in an amount of two to ten pounds of N-butylethanolamine per 100 gallons of finished formulation, and storing said latex paint, uncured coating, uncured sealant, or uncured adhesive formulation under anaerobic conditions.

4. Method according to claim 3 in which the N-butylethanolamine is BAE.

5. Method according to claim 3 in which the stored latex paint, uncured coating, uncured sealant, or uncured adhesive formulation is based on resins comprising copolymers of acrylate esters, vinyl acetate and/or styrene.

6. A method of stabilizing a stored latex paint, uncured coating, uncured sealant, or uncured adhesive formulation, comprising adding thereto an N,N'-dialkylethanolamine wherein the two N-alkyl groups are straight chain or branched butyl groups, in combination with a biocide, in an amount of two to ten pounds of N,N'-dibutylethanolamine per 100 gallons of finished formulation, and storing said latex paint, uncured coating, uncured sealant, or uncured adhesive formulation under anaerobic conditions.

7. Method according to claim 6 in which the N,N'-dibutylethanolamine is DBAE.

8. Method according to claim 6 in which the stored latex paint, uncured coating, uncured sealant, or uncured adhesive formulation is based on resins comprising copolymers of acrylate esters, vinyl acetate and/or styrene.

* * * * *